(12) United States Patent  (10) Patent No.: US 8,644,410 B2
Suzuki et al.  (45) Date of Patent: Feb. 4, 2014

(54) BASE STATION AND RECEIVING METHOD

(75) Inventors: Yusuke Suzuki, Fujisawa (JP);
 Hideyuki Kannari, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 22 days.

(21) Appl. No.: 13/433,634

(22) Filed: Mar. 29, 2012

(65) Prior Publication Data

US 2013/0083876 A1  Apr. 4, 2013

(30) Foreign Application Priority Data

May 18, 2011  (JP) .................................. 2011-111635

(51) Int. Cl.
 *H04B 7/02* (2006.01)
 *H04L 1/02* (2006.01)
(52) U.S. Cl.
 USPC .......................................... 375/267; 375/299
(58) Field of Classification Search
 USPC ................................. 375/267, 299
 See application file for complete search history.

(56) References Cited

U.S. PATENT DOCUMENTS

2010/0118921 A1* 5/2010 Abdelmonem et al. ...... 375/148
2012/0076238 A1* 3/2012 Catreux et al. ................ 375/299

FOREIGN PATENT DOCUMENTS

JP 2007-006219 1/2007

* cited by examiner

*Primary Examiner* — Chieh M Fan
*Assistant Examiner* — Tanmay Shah
(74) *Attorney, Agent, or Firm* — Fujitsu Patent Center

(57) ABSTRACT

A base station includes antennas, a local signal generator; first and second mixers generating first and second mixed signals by mixing first and second signals from first and second antenna among the antennas and the local signal; first and second analog digital converters converting to first and second digital signals, first and second interference detecting units detecting first and second interference signals based on the first and second digital signals; first and second interference removing units generating first and second processed signals by removing the first and second interference signals by first and second filters having first and second filter central frequencies shifted in first and second directions from first and second interference central frequencies of the first and second interference signals, respectively; and a combining unit combining the first and second processed signals.

7 Claims, 10 Drawing Sheets

| INTERFERENCE SIGNAL DETECTING FREQUENCY | NOTCH FILTER ASSIGNING FREQUENCY | FILTER COEFFICIENT |
|---|---|---|
| ××MHz | ××MHz+$\Delta f/2$ | aaaa |
| ○○MHz | ○○MHz+$\Delta f/2$ | vvvv |
| ⋮ | ⋮ | ⋮ |

| INTERFERENCE SIGNAL DETECTING FREQUENCY | NOTCH FILTER ASSIGNING FREQUENCY | FILTER COEFFICIENT |
|---|---|---|
| ××MHz | ××MHz−Δf/2 | bbbb |
| ○○MHz | ○○MHz−Δf/2 | yyyy |
| ⋮ | ⋮ | ⋮ |

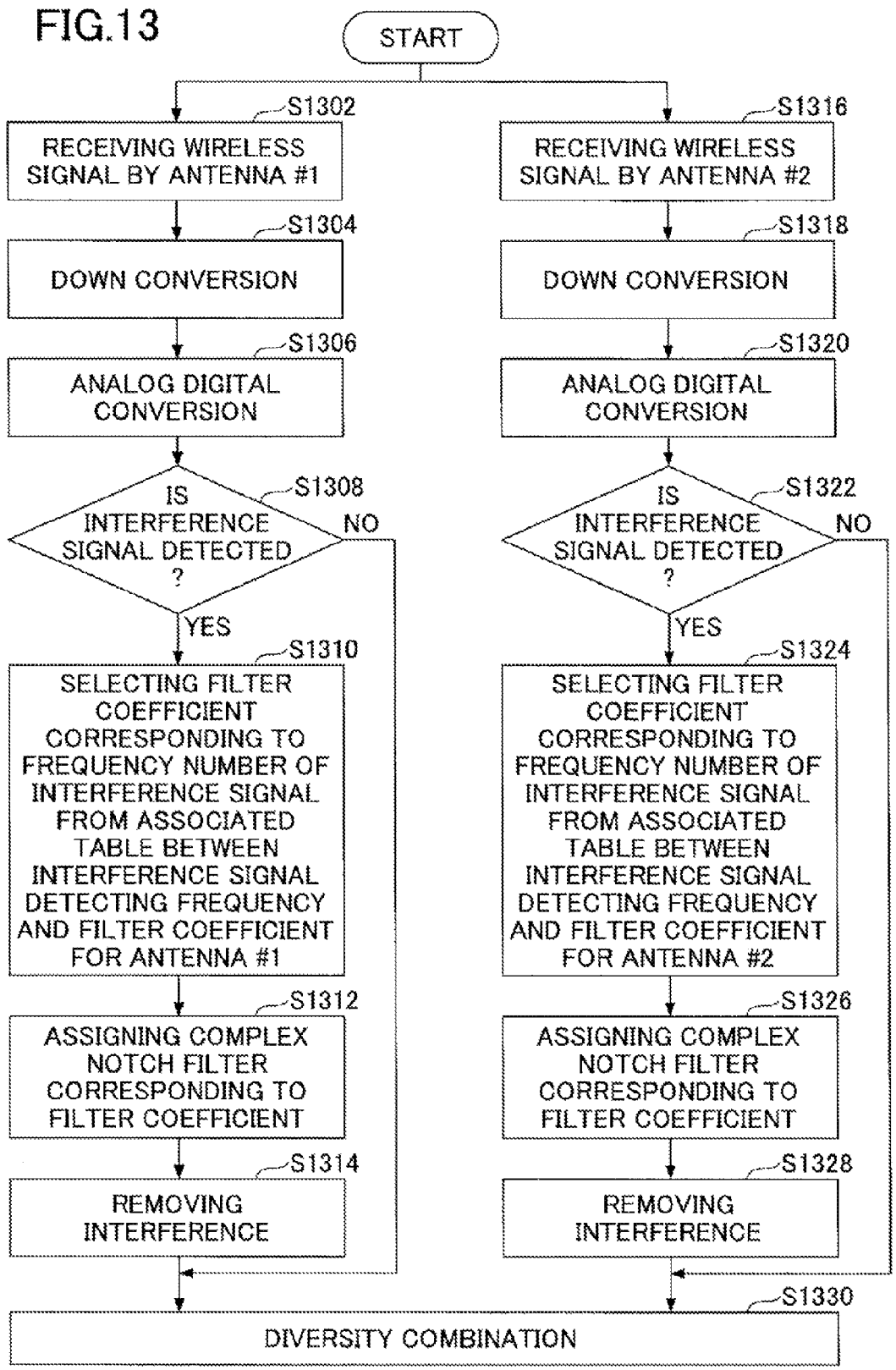

US 8,644,410 B2

BASE STATION AND RECEIVING METHOD

CROSS-REFERENCE TO RELATED APPLICATIONS

This patent application is based upon and claims the benefit of priority of the prior Japanese Patent Application No. 2011-111635 filed on May 18, 2011, the entire contents of which are incorporated herein by reference.

FIELD

The embodiments discussed herein are related to a radio communications system, more specifically to a base station for the communications system and a receiving method.

BACKGROUND

A technique of removing interference signals caused by unlicensed personal wireless communication or the like in a wireless communications system is wanted.

As a technique for removing the interference signals, the following technique is known in, for example, Japanese Laid-open Patent Publication No. 2007-6219, as follows.

According to the technique, the interference signals are extracted for each antenna branch, the extracted interference signals are removed, and radio waves from which the interference signals are removed are synthesized.

SUMMARY

According to an aspect of the embodiment, a base station includes a plurality of antennas; a local signal generator configured to generate a local signal; a first mixer configured to generate a first mixed signal obtained by mixing a first signal from a first antenna among the antennas and the local signal from the local signal generator; a first analog digital converter configured to convert the first mixed signal to a first digital signal; a first interference detecting unit configured to detect a first interference signal based on the first digital signal; a first interference removing unit configured to generate a first processed signal by removing the first interference signal by a first filter having a first filter central frequency which is shifted in a first direction from a first interference central frequency of the first interference signal; a second mixer configured to generate a second mixed signal obtained by mixing a second signal from a second antenna among the antennas and the local signal from the local signal generator; a second analog digital converter configured to convert the second mixed signal to a second digital signal; a second interference detecting unit configured to detect a second interference signal based on the second digital signal; a second interference removing unit configured to generate a second processed signal by removing the second interference signal by a second filter having a second filter central frequency which is shifted in a second direction from a second interference central frequency of the second interference signal; and a combining unit configured to combine the first processed signal and the second processed signal.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 13 illustrates an exemplary operation in the base station of the embodiment.

DESCRIPTION OF EMBODIMENT

Figure 1:
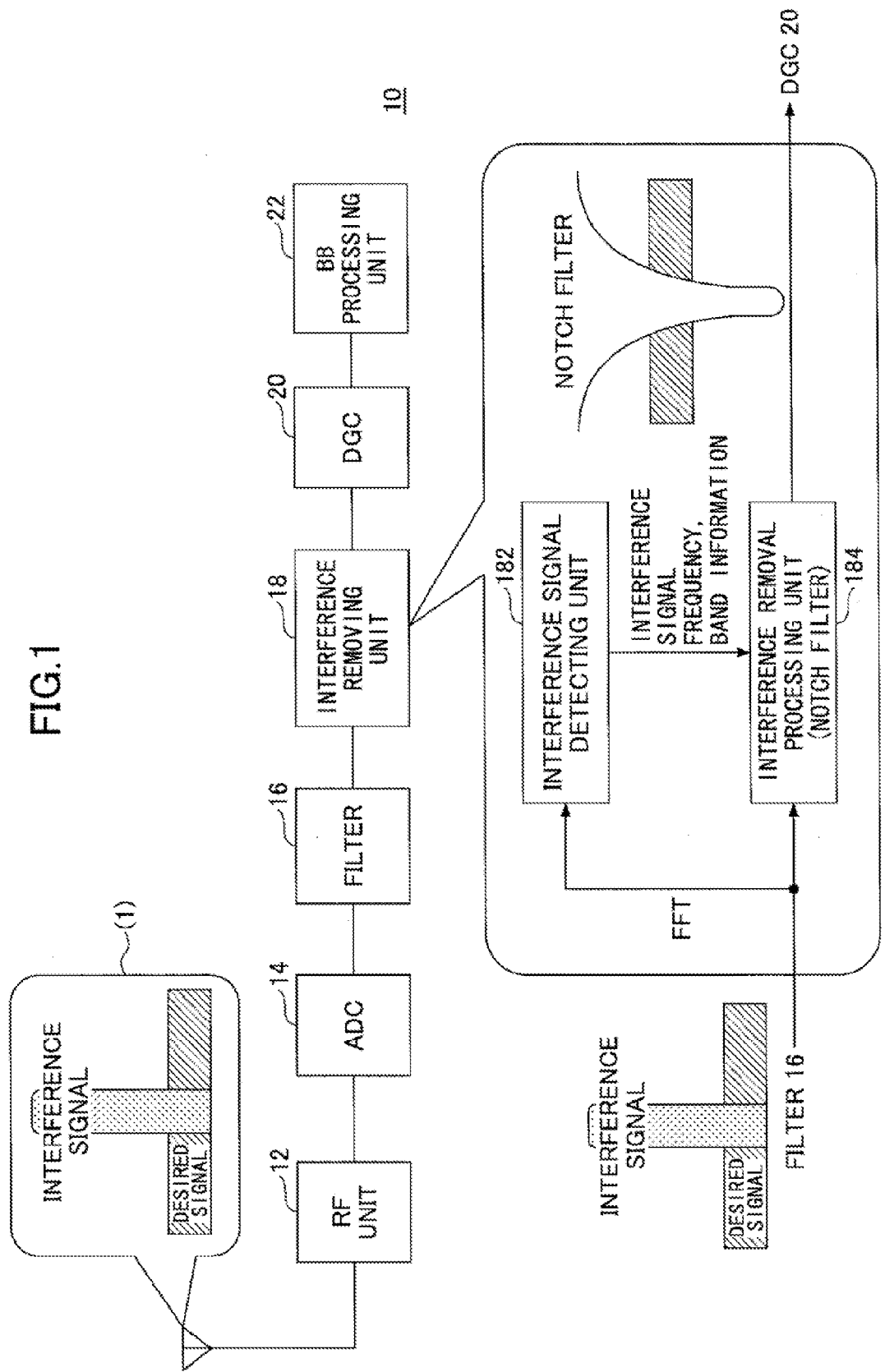
FIG. 1 schematically illustrates an exemplary structure of a receiving device.

Referring to FIG. 1, a received signal from an antenna is sent to a radio frequency (RF) unit 12. The received signal includes a desired signal and an interference signal.

The RF unit 12 converts a received signal so as to have an intermediate frequency and the converted signal is sent to an Analog Digital Converter (ADC) 14. The ADC 14 converts the received signal sent from the RF unit 12 to a digital signal and sends the converted digital signal to a filter 16. The filter 16 removes unwanted frequency components from the input digital signal. The signal from which the unwanted frequency component is removed is sent to an interference removing unit 18. The interference removing unit removes interference signal components from the digital signal received from the filter 16 and sends the digital signal from which the interference signal component is removed to a Digital Gain Control (DGC) 20. The DGC 20 applies a gain control to the signal received from the interference removing unit 18, and sends the signal applied with the gain control to a Baseband (BB) processing unit 22. The BB processing unit applies a baseband process to the signal received from the DGC 20.

The processes in the interference removing unit 18 are explained next.

The received signal is converted to a digital signal I and a digital signal Q. The converted digital signals I and Q undergo a fast Fourier transformation in an interference signal detecting unit 182 to thereby detect the frequency of the interference signal. The interference signal detecting unit 182 sends the frequency of the interference signal and information indicative of the band of the interference signal in an interference removal processing unit 184. The interference removal processing unit 184 removes the interference signal by applying a complex notch filter to the digital signal received from the filter 16 based on the frequency of the interference signal input by the interference signal detecting unit 182 and the information indicative of the band of the interference signal. By applying the complex notch filter to the digital signal, it is possible to attenuate the interference signal so as to be at an extremely low level.

Figure 2:
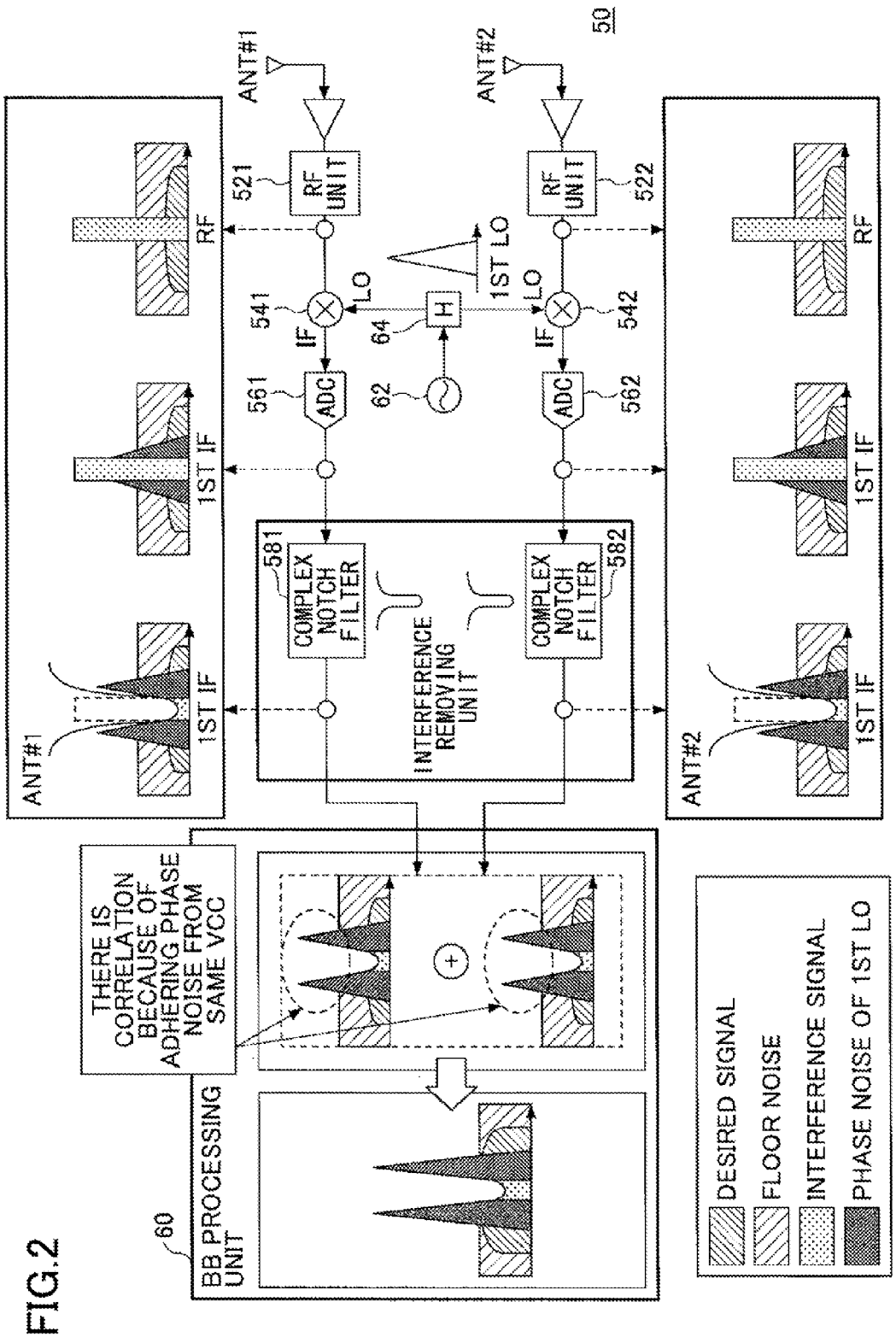
FIG. 2 schematically illustrates a function of the receiving device.

Next, referring to FIG. 2, diversity reception by a receiving device 50 is described. Referring to FIG. 2, the same wireless signal is received by two antennas ANT #1 and ANT #2.

The signal received by the receiving device 50 includes a desired signal and an interference signal. The interference signal includes floor noise and broadband interference signals. There is a certain level of the band in the broadband interference signals. The interference signal may also be called "disturbing waves".

A signal received from the antenna #1 is received by a RF unit 521 and sent to an mixer 541.

Meanwhile, a local signal generated by a voltage-controlled oscillator (VCO) 62 is sent to a divider 64. The divider 64 divides the local signal from the voltage-controlled oscillator 62 and sends the divided signals to the mixer 541.

The mixer 541 converts the divided signal into a signal having an intermediate frequency (IF) by mixing the local signal received from the divider 64 and the signal from the RF unit 521. The converted signal is sent to an ADC 561. In converting to the signal having the intermediate frequency, there is a probability that phase noise of the local signal is incorporated in the signal having the intermediate frequency (IF).

The ADC 561 converts the signal from the mixer 541 to a digital signal and sends the converted digital signal to a complex notch filter 581. The complex notch filter 581 removes the interference signal from the digital signal received from the ADC 561 by attenuating the interference signal so as to be at a very low level. The complex notch filter 581 sends the digital signal from which the interference signal is removed to a BB processing unit 60. If the interference signal is attenuated to be at the low level by the complex notch filter 581, phase noise may not be sufficiently removed. In this case, the phase noise of the local signal may not be completely removed by the complex notch filter 581 and therefore remain.

A signal received from the antenna #2 is received by a RF unit 522 and sent to a mixer 542.

The mixer 542 converts the received signal to a signal having an intermediate frequency by mixing the local signal from the divider 64 and the signal received from the RF unit 522. The converted signal is sent to a ADC 562. In converting to the signal having the intermediate frequency, there is a probability that phase noise of the local signal is adhered to (incorporated in) the signal having the intermediate frequency (IF).

The ADC 562 converts the signal having the intermediate frequency from the mixer 542 to a digital signal and sends the converted digital signal to a complex notch filter 582. The complex notch filter 582 removes the interference signal from the digital signal received from the ADC 562 by attenuating the interference signal so as to be at a very low level. The complex notch filter 582 sends the digital signal from which the interference signal is removed to the BB processing unit 60. If the interference signal is attenuated to be at the low level by the complex notch filter 582, phase noise may not be sufficiently removed. In this case, the phase noise of the local signal may not be completely removed by the complex notch filter 582 and therefore remain.

The BB processing unit 60 combine the signal from the complex notch filter 581 and the signal from the complex notch filter 582 with a diversity combination. At the time of the diversity combination, the phase noise of the local signal which is contained in the signal from the complex notch filter 581 and has not been sufficiently removed by the complex notch filter 581 and the phase noise of the local signal which is contained in the signal from the complex notch filter 582 and has not been sufficiently removed by the complex notch filter 582 undergo the diversity combination. Because the phase noise of the local signal contained in the signal from the complex notch filter 581 and the phase noise of the local signal contained in the signal from the complex notch filter 582 are adhering phase noise generated based on the local signal from the same voltage-controlled oscillator 62, the phase noise of the local signal contained in the signal from the complex notch filter 581 and the phase noise of the local signal contained in the signal from the complex notch filter 582 have a correlation. Because there is a correlation, the adhering phase noise is excessively stressed at the time of the diversity combination. Therefore, there is a case where the BB processing unit 60 can obtain an insufficient diversity effect because the maximum ratio combined gain cannot be obtained up to an expected value, in theory. Therefore, the diversity effect may be lowered.

A description is given below, with reference to FIG. 1 through FIG. 13 of embodiments of the present invention. Throughout the figures, portions having the same reference symbol are used for portions having the same function, and descriptions are not repeated for the same portions.

<Base Station>

Figure 3:
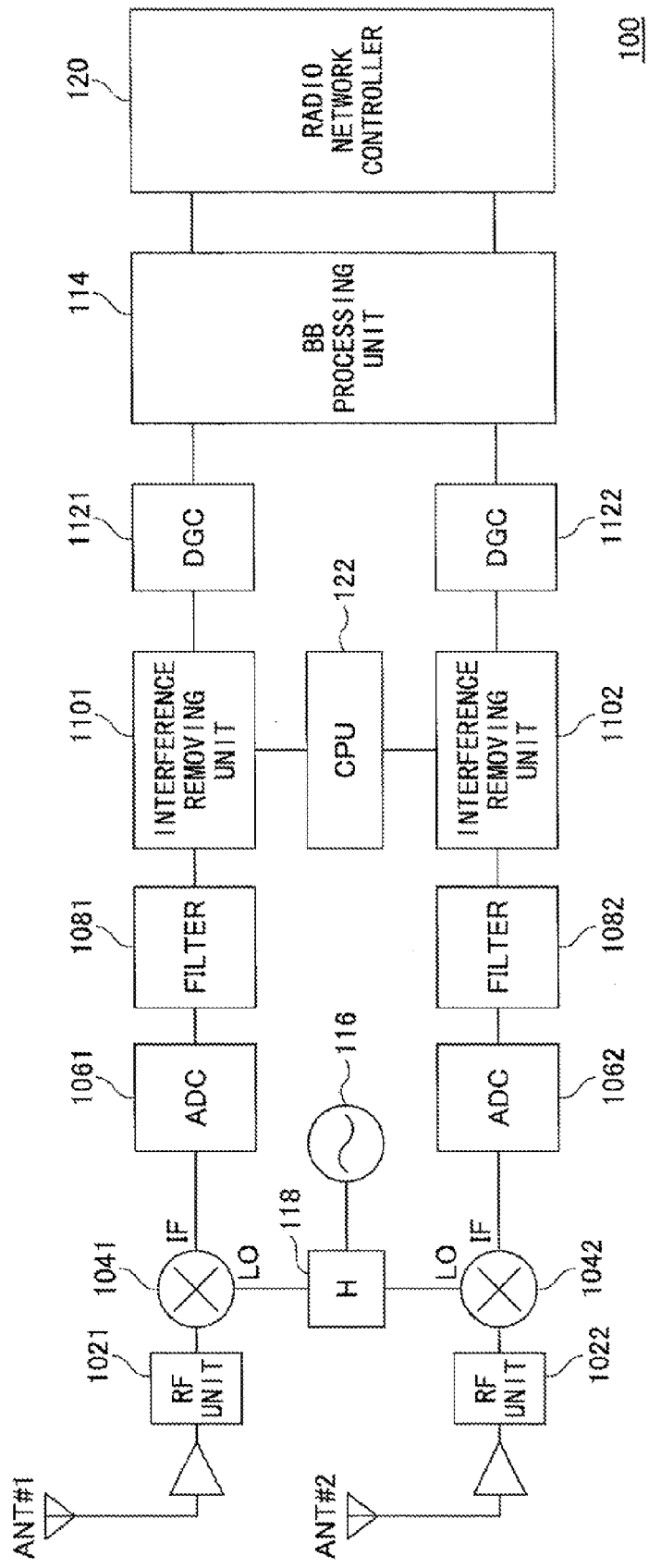
FIG. 3 schematically illustrates an exemplary structure of a base station of the embodiment.
Figure 4:
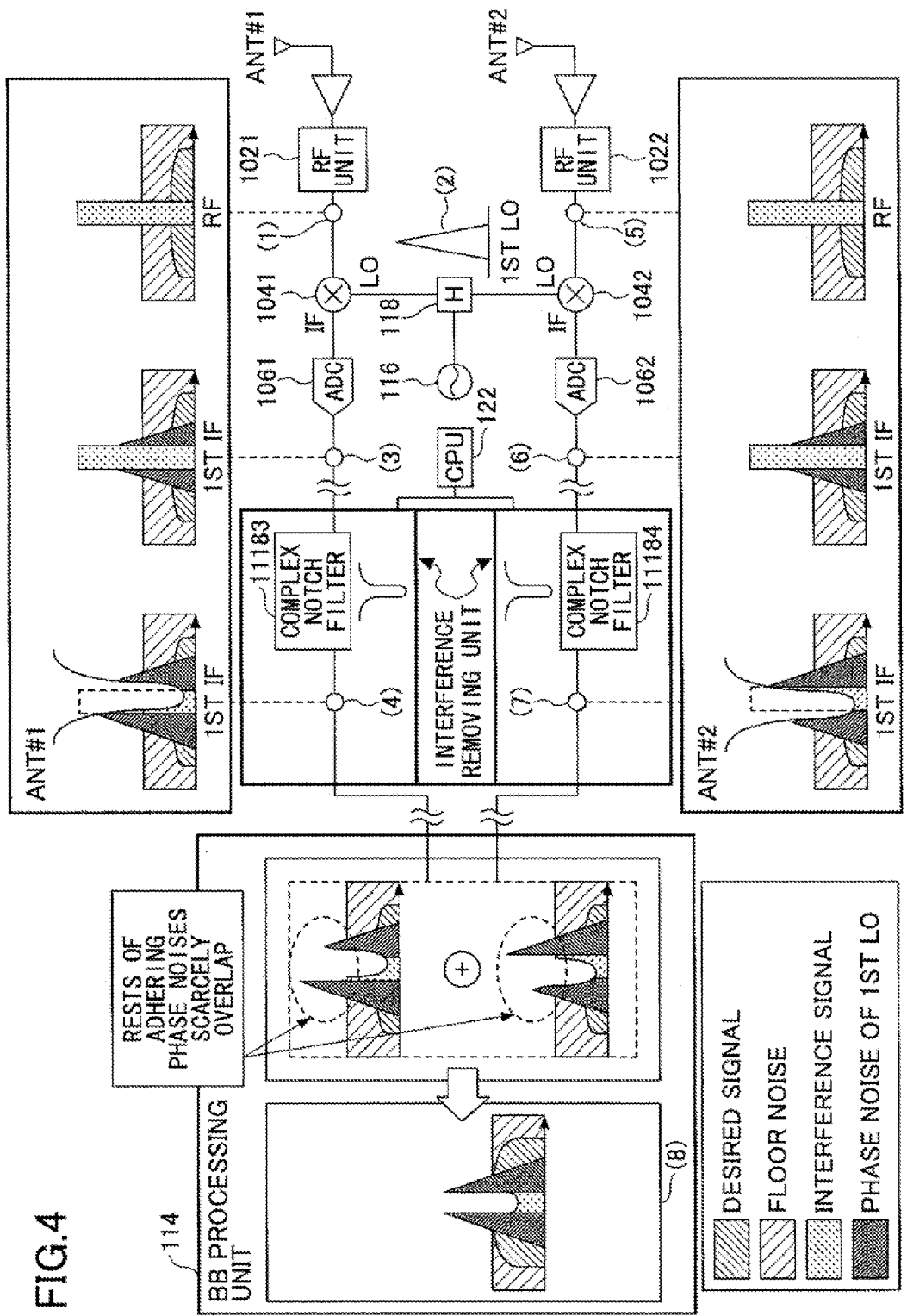
FIG. 4 schematically illustrates a function of the base station of the embodiment.

FIG. 3 illustrates an example of the base station 100 of the embodiment. FIG. 4 illustrates outputs signals from functional blocks of the base station 100 of the embodiment. Referring to FIG. 3 and FIG. 4, a portion of the receiving device included in the base station 100 is described, and other than the portion of the receiving device is expressed as a radio network controller.

In the base station 100, the interference signals in the signals received by plural antennas are attenuated to be at a low level. Said differently, the base station 100 receives a wireless signal sent by a user terminal (not illustrated). In the base station 100, the interference signal is removed by complex notch filters 11183 and 11184 having a central frequency and shifted in directions of different frequencies relative to the frequency of the interference signal to be detected at a time of attenuating the interference signal to be at the low level. Said differently, there are provided complex notch filters respectively having filter coefficients corresponding to central frequencies, which are shifted to different frequencies of the interference signals contained in the signals received by the plural antennas. By determining the filter coefficients used in removing the interference signals by the complex notch filters 11183 and 11184 so as to have different values, the signals to be sent to a BB processing unit 114 is changed to have different frequencies of the phase noise which has not been removed by the complex notch filters. Since the frequencies of the phase noise are changed, after the diversity combination, the changed frequencies are less stressed. Therefore, the signal obtained by the diversity combination can provide a sufficient maximum ratio combined gain to thereby improve a diversity effect.

The base station 100 includes plural antennas. For example, a case where the base station 100 includes two antennas is described. However, the above example is applicable to a case where more than three antennas are provided in the base station 100. The example is also applicable to a case where a disturbing wave is received as the interference signal.

The base station 100 includes a RF unit 1021. The RF unit 1021 is connected to an antenna #1. The RF unit 1021 receives a wireless signal from the antenna #1 and sends the received signal to a mixer 1041. An output signal from the RF unit 1021 includes a desired signal, floor noise and an interference signal, as indicated in an output signal at (1) of FIG. 4 (see explanatory note on the left bottom).

The base station 100 includes a voltage-controlled oscillator 116. The voltage-controlled oscillator 116 generates a local signal. As illustrated in the output signal corresponding to (2) of FIG. 4, the local signal is an oscillation signal of the voltage-controlled oscillator 116. The voltage-controlled oscillator 116 sends the local signal to a divider 118.

The base station 100 includes the divider 118. The divider 118 is connected to the voltage-controlled oscillator 116. The divider 118 divides the local signal from the voltage-controlled oscillator 116 and sends the divided signals to the mixers 1041 and 1042.

The base station 100 includes the mixer 1041. The mixer 1041 is connected to the RF unit 1021 and the divider 118. The mixer 1041 converts the received signal to a signal having an intermediate frequency by mixing the local signal from the divider 118 and the signal received from the RF unit 1021. The converted signal is sent to an ADC 1061. In converting to the signal having the intermediate frequency, there is a probability that phase noise of the local signal received from the voltage-controlled oscillator 116 is adhered to the signal having the intermediate frequency (IF).

The base station 100 includes the ADC 1061. The ADC 1061 is connected to the mixer 1041. The ADC 1061 converts the signal from the mixer 1041 to a digital signal. The ADC 1061 sends the digital signal to a filter 1081. A signal output from the ADC 1061 includes a desired signal, a floor noise and an interference signal as illustrated in FIG. 4 at the point (3), and appears at frequencies in the vicinity of the frequency of the interference signal.

The base station 100 includes the filter 1081. The filter 1081 is connected to the ADC 1061. The filter 1081 removes an unwanted frequency component from the digital signal sent from the ADC 1061. The signal from which the unwanted frequency component is removed is sent to an interference removing unit 1101.

The base station 100 includes the interference removing unit 1101. The interference removing unit 1101 is connected to the filter 1081. The interference removing unit 1101 removes an interference signal component from the digital signal received from the filter 1081 and sends the digital signal from which the interference signal component is removed to a Digital Gain Control (DGC) 1121.

The base station 100 includes the DGC 1121. The DGC 1121 applies a gain control to the signal received from the interference removing unit 1101, and sends the signal applied with the gain control to a Baseband (BB) processing unit 114. Said differently, the DGC 1121 amplifies the signal received from the interference removing unit 1101 when necessary.

The base station 100 includes a CPU 122. The CPU 122 is connected to the interference removing unit 1101 and an interference removing unit 1102. The CPU 122 functions the base station 100 as the interference removing unit 1101 and the interference removing unit 1102. A MPU or a DSP may be used instead of the CPU 122.

<Interference Removing Unit 1101>

Figure 5:
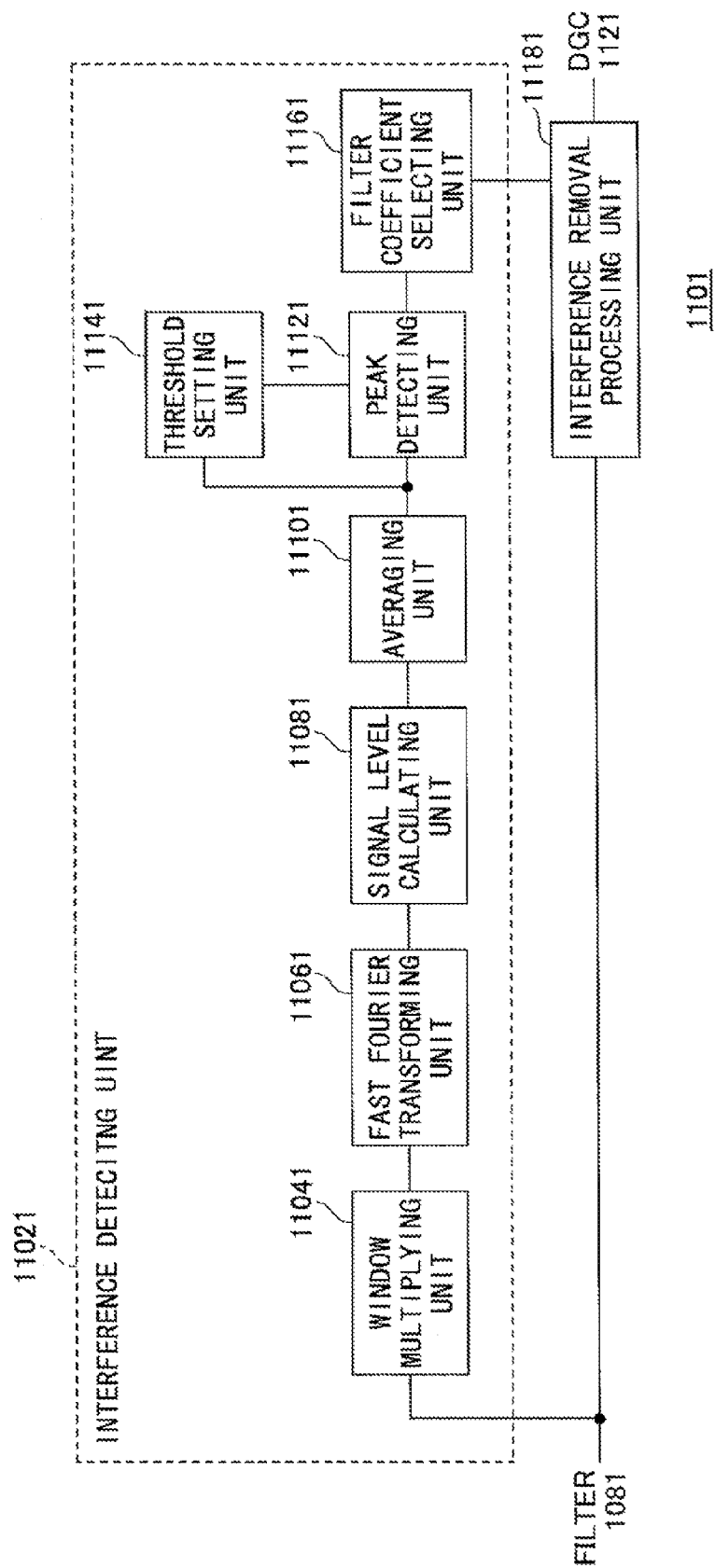
FIG. 5 schematically illustrates a part of an exemplary structure of the base station of the embodiment.

FIG. 5 illustrates a detail of the interference removing unit 1101. The process of the interference removing unit 1101 is realized by the CPU 122.

The interference removing unit 1101 includes an interference detecting unit 11021. The interference detecting unit 11021 is connected to the filter 1081. The interference detecting unit 11021 determines whether the signal received from the filter 1081 includes an interference signal. The interference detecting unit 11021 determines whether the signal received from the filter 1081 includes the interference signal, the interference signal is detected. The interference detecting unit 11021 selects a filter coefficient of a filter applied when the interference signal is removed from the signal received from the filter 1081 based on the interference signal. The interference detecting unit 11021 sends information indicative of the filter coefficient to an interference removal processing unit 11181.

The interference removing unit 1101 includes an interference removal processing unit 11181. The interference removal processing unit 11181 is connected to the filter 1081 and the interference detecting unit 11021. The interference removal processing unit 11181 removes the interference signal from the signal received from the filter 1081 by the complex notch filter 11183 having a filter coefficient to be input from the interference detecting unit 11021. The interference removal processing unit 11181 sends a signal from which the interference signal is removed to the DGC 1121.

The interference detecting unit 11021 is described next.

The interference detecting unit 11021 includes a window multiplying unit 11041. The window multiplying unit 11041 multiplies the signal from the filter 1081 by a window function and the multiplied signal is sent to the fast Fourier transforming unit 11061.

The interference detecting unit 11021 includes the fast Fourier transforming unit 11061. The fast Fourier transforming unit 11061 is connected to a window multiplying unit 11041. The fast Fourier transforming unit 11061 provides the signal received from the window multiplying unit 11041 with a fast Fourier transformation and the signal provided with the fast Fourier transformation is sent to a signal level calculating unit 11081.

The interference detecting unit 11021 includes the signal level calculating unit 11081. The signal level calculating unit 11081 calculates a signal level based on a signal received from the fast Fourier transforming unit 11061. The signal level calculating unit 11081 performs a calculation of electric power based on an I signal and a Q signal received from the fast Fourier transforming unit 11061. The signal level calculating unit 11081 sends the calculation values of electric power to an averaging unit 11101.

The interference detecting unit 11021 includes the averaging unit 11101. The averaging unit 11101 is connected to the signal level calculating unit 11081. The averaging unit 11101 averages the calculation values of electric power received from the signal level calculating unit 11081. The averaging unit 11101 obtains an average value by averaging calculation values of electric power obtained by a predetermined number of the calculations of electric power in the signal level calculating unit 11081. Specifically, when the calculation values (as many as 16) of electric power are input to the averaging unit 11101 from the signal level calculating unit 11081, the average value may be obtained. However, the number of the calculation values of electric power to be averaged is not limited to 16 and an appropriate value may be set up. The averaging unit 11101 sends the average value as a signal level to a threshold setting unit 11141 and a peak detecting unit 11121.

Figure 6:
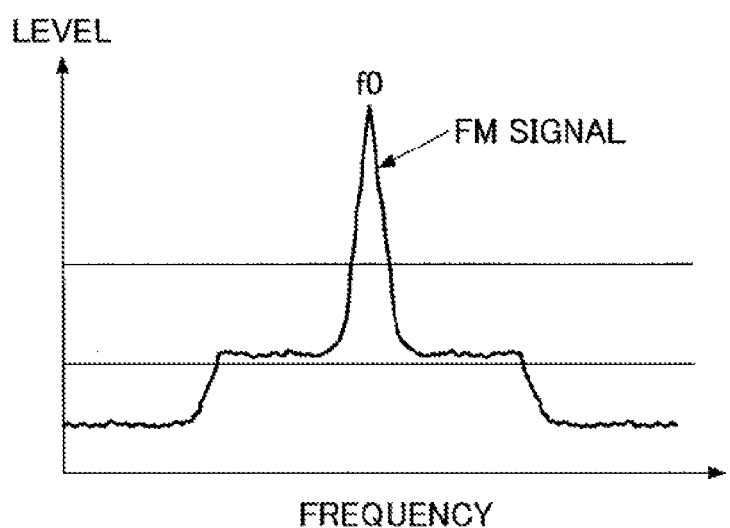
FIG. 6 illustrates an exemplary signal processing in the base station of the embodiment.

FIG. 6 is an exemplary signal output from the averaging unit 11101. Referring to FIG. 6, the abscissa axis indicates a frequency and the ordinate axis indicates a signal level. The signal level may be represented by an average value obtained by averaging the calculation values of electric power. At this time, an interference signal may be received together with a desired signal. A disturbing signal may be received together with the desired signal. Referring to FIG. 6, a FM signal is received as a disturbing wave as an example. Referring to FIG. 6, the peak level of the FM signal is obtained at a frequency f0.

The interference detecting unit 11021 includes the threshold setting unit 11141. The threshold setting unit 11141 is connected to the averaging unit 11101. The threshold setting unit 11141 calculates a threshold. Said differently, the threshold setting unit 11141 may calculate the threshold value by considering the signals received from the averaging unit 11101 while excluding a predetermined number of points or the calculation values of electric power. Specifically, the threshold setting unit 11141 obtains the threshold value (e.g., an average value) after the threshold setting unit 11141 removes (excludes) 64 points from the higher side of the signal level of the signal (the calculation values of electric power) received from the averaging unit 11101. By excluding the 64 points from the higher side of the signal level, it is possible to reduce an influence caused by a measurement error and so on. The threshold value may be obtained by adding a margin to the average value. By appropriately setting the margin, it is possible to adjust a detection accuracy for the interference signal. However, the number of points to be excluded from the higher side of the signal level is not limited to 64 and an appropriate value may be set up. The threshold setting unit 11141 sends the threshold value to the peak detecting unit 11121.

Figure 7:
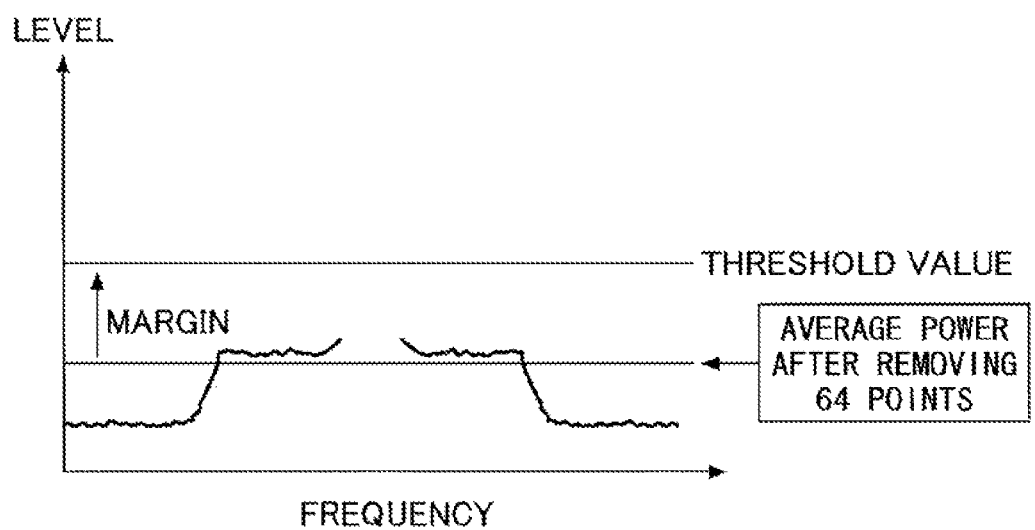
FIG. 7 illustrates an exemplary signal processing in the base station of the embodiment.

FIG. 7 illustrates a signal to be output from the threshold setting unit 11141. Referring to FIG. 7, the abscissa axis indicates a frequency and the ordinate axis indicates a signal level. The threshold setting unit 11141 excludes the 64 points from the signal (the calculation values of electric power) having higher signal levels used for averaging in the averaging unit 11101. The threshold setting unit 11141 obtains an average of the signals (the calculation values of electric power) from which the 64 points are removed. The average is indicated as the "AVERAGE POWER AFTER REMOVING 64 POINTS" in FIG. 7. The threshold setting unit 11141 determines the threshold by adding the predetermined value to the average.

The interference detecting unit 11021 includes the peak detecting unit 11121. The peak detecting unit 11121 is connected to the threshold setting unit 11141 and the averaging unit 11101. The peak detecting unit 11121 detects a signal, which has the maximum (peak) signal level (hereinafter, referred to as "a peak signal") among the signal levels to be the threshold value sent from the threshold setting unit 11141 or higher, out of the signals sent from the averaging unit 11101.

By detecting the signal having the signal level being the threshold value or higher, the interference signal can be detected. By detecting the signal having the maximum (peak) signal level, it is possible to select the filter coefficient to be used for removing the interference signal. Further, the peak detecting unit 11121 sends information indicative of the peak signal to the filter coefficient selecting unit 11161. The peak detecting unit 11121 sends an identifier of the peak signal, which has the maximum (peak) signal level among the signal levels to be the threshold value sent from the threshold setting unit 11141 or higher out of the signals sent from the averaging unit 11101, to the filter coefficient selecting unit 11161.

The identifier may be realized by an identification number (hereinafter, referred to as "a frequency number") for identifying the frequency.

Figures 8, 9:
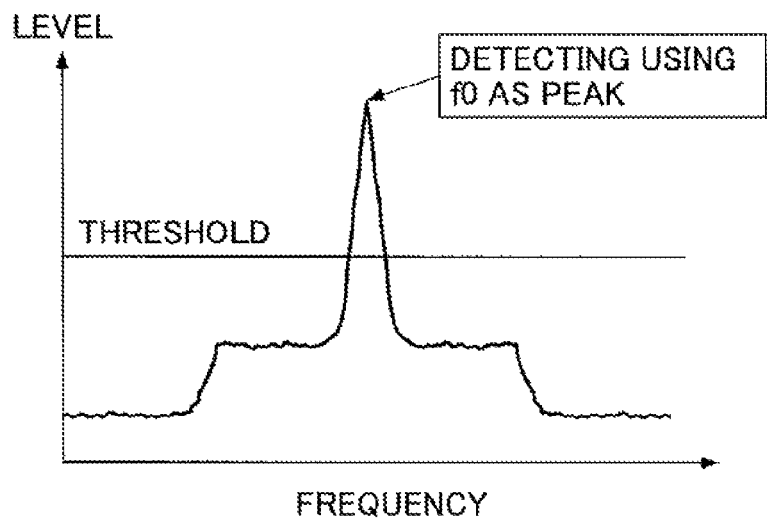
FIG. 8 illustrates an exemplary signal processing in the base station of the embodiment.
FIG. 9 illustrates an exemplary correspondence table between an interference signal detecting frequency and a filter coefficient.

FIG. 8 illustrates a signal for explaining the frequency number to be output from the peak detecting unit 11121. Referring to FIG. 8, the abscissa axis indicates a frequency and the ordinate axis indicates a signal level. The peak detecting unit 11121 detects the signal, which has the maximum signal level being the threshold value sent from the threshold setting unit 11141 or higher among the signals sent from the averaging unit 11101, and sends information indicative of the frequency corresponding to the detected signal. Referring to FIG. 8, f0 is output as the frequency number of the signal having the signal level being the threshold value, which is sent from the threshold setting unit 11141, or higher among the signals sent from the averaging unit 11101.

The interference detecting unit 11021 includes the filter coefficient selecting unit 11161. The filter coefficient selecting unit 11161 is connected to the peak detecting unit 11121. The filter coefficient selecting unit 11161 selects the filter coefficient of the complex notch filter 11183 used in removing the interference signal by the interference removal processing unit 11181 based on the frequency number to be sent from the peak detecting unit 11121. Said differently, the filter coefficient selecting unit 11161 refers to a table associating the frequency of the interference signal detected from a signal received from the antenna #1 with the filter coefficient (hereinafter, referred to as an associated table between the filter coefficient and the interference signal detecting frequency for the antenna #1 or an associated table for the antenna #1) and selects the filter coefficient corresponding to the frequency number sent to the peak detecting unit 11121. The filter coefficient selecting unit 11161 sends the filter coefficient to the interference removal processing unit 11181.

FIG. 9 is an exemplary associated table between the filter coefficient and the interference signal detecting frequency for the antenna #1. FIG. 9 illustrates the exemplary associated table between the frequency of the interference signal detected from the signal received by the antenna #1 and the filter coefficient. The frequency of the interference signal may be expressed by using the frequency at which the peak signal is detected. Said differently, referring to FIG. 9, if the frequency expressed by the frequency number sent from the peak detecting unit 11121 is "XX MHz", "XX MHz+$\Delta$f/2" is selected as a complex notch filter assigning frequency and "aaaa" is selected as the filter coefficient. Said differently, referring to FIG. 9, if the frequency expressed by the frequency number sent from the peak detecting unit 11121 is "oo MHz", "oo MHz+$\Delta$f/2" is selected as a complex notch filter assigning frequency and "vvvv" is selected as the filter coefficient. In the correspondence table for the antenna #1, the frequency obtained by shifting the frequency in a direction greater than the frequency of the peak signal is referred to as the complex notch filter assigning frequency and the filter coefficient corresponding to the complex notch filter assigning frequency is determined.

The interference removal processing unit 11181 applies the complex notch filter 11183 having the filter coefficient received from the filter coefficient selecting unit 11161 to the digital signal received from the filter 1081 to thereby remove the interference signal. Then, the interference removal processing unit 11181 sends the signal from which the interference signal is removed to a DGC 1121. The output signal from the interference removal processing unit 11181 is as illustrated at (4) in FIG. 4, which is obtained by applying the complex notch filter 11183 having a central frequency obtained by adding $\Delta$f/2 to the frequency of the peak signal to be detected by the peak detecting unit 11121 to the output signal at (3) in FIG. 4. Therefore, the waveform of the output signal from the interference removal processing unit 11181 having the phase noise at the higher frequency side is removed relative to the frequency of the peak signal and therefore there are many remaining portions of the phase noise on the low frequency side.

The base station 100 includes a RF unit 1022. The RF unit 1022 is connected to an antenna #2. The RF unit 1022 receives a wireless signal from the antenna #2 and sends the received signal to a mixer 1042. An output signal from the RF unit 1022 includes a desired signal, floor noise and an interference signal, as indicated in an output signal at (5) of FIG. 4 (see explanatory note on the left bottom).

The base station 100 includes the mixer 1042. The mixer 1042 is connected to the RF unit 1022 and the divider 118. The mixer 1042 converts the received signal to a signal having an intermediate frequency by mixing the local signal from the divider 118 and the signal received from the RF unit 1022. The converted signal is sent to an ADC 1062. In converting to the signal having the intermediate frequency, there is a probability that phase noise of the local signal received from the voltage-controlled oscillator 116 is adhered to the signal having the intermediate frequency (IF).

The base station 100 includes the ADC 1062. The ADC 1062 is connected to the mixer 1042. The ADC 1062 converts the signal from the mixer 1042 to a digital signal. The ADC 1062 sends the digital signal to a filter 1082. A signal output from the ADC 1062 includes a desired signal, a floor noise and an interference signal as illustrated in FIG. 4 at the point (6), and appears at frequencies in the vicinity of the frequency of the interference signal.

The base station 100 includes the filter 1082. The filter 1082 is connected to the ADC 1062. The filter 1082 removes an unwanted frequency component from the digital signal sent from the ADC 1062. The signal from which the unwanted frequency component is removed is sent to an interference removing unit 1102.

The base station 100 includes the interference removing unit 1102. The interference removing unit 1102 is connected to the filter 1082. The interference removing unit 1102 removes an interference signal component from the digital signal received from the filter 1082 and sends the digital signal from which the interference signal component is removed to a Digital Gain Control (DGC) 1122.

The base station 100 includes the DGC 1122. The DGC 1122 applies a gain control to the signal received from the interference removing unit 1102, and sends the signal applied with the gain control to the Baseband (BB) processing unit 114. Said differently, the DGC 1122 amplifies the signal received from the interference removing unit 1102 when necessary.

<Interference Removing Unit 1102>

Figure 10:
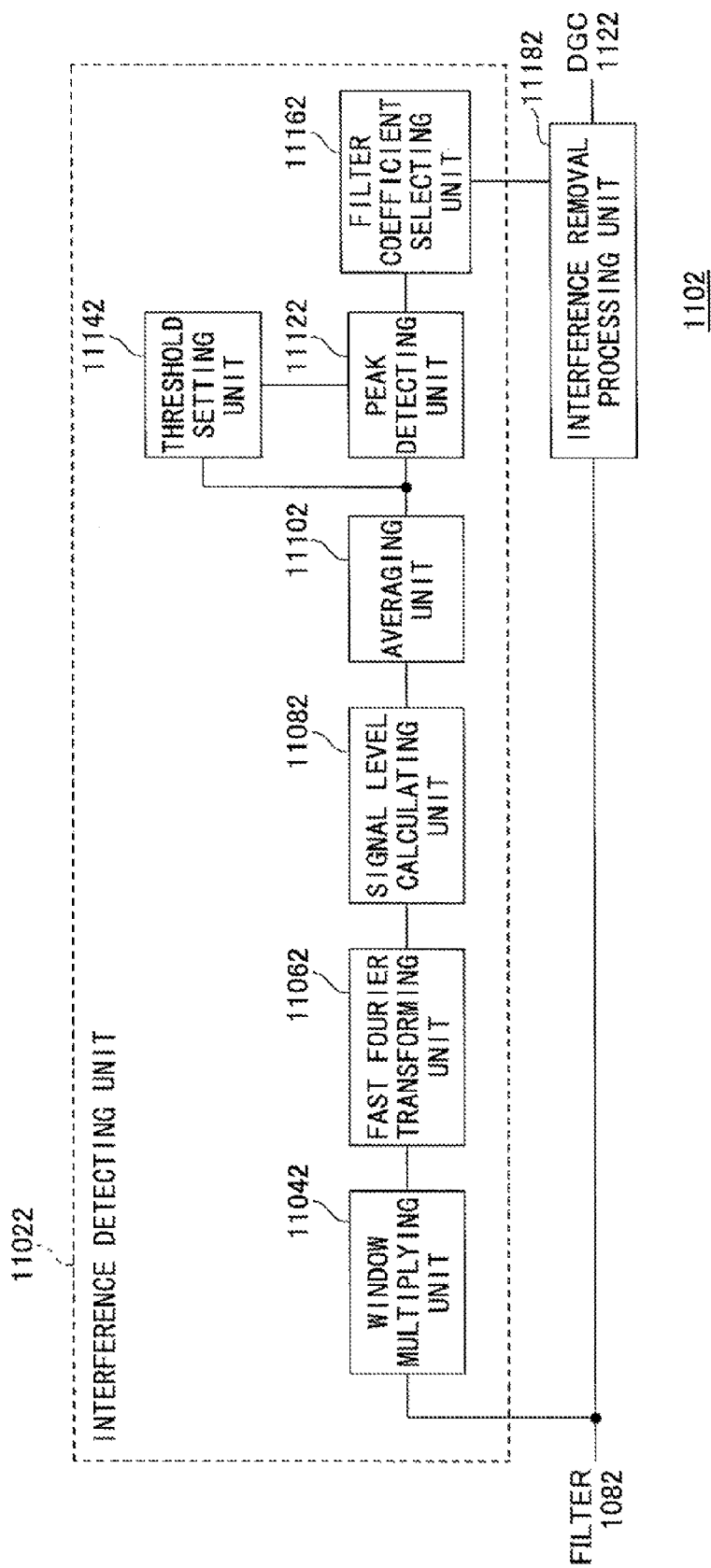
FIG. 10 schematically illustrates a part of an exemplary structure of the base station of an embodiment.

FIG. 10 illustrates a detail of the interference removing unit 1102. The processes performed in functional blocks are substantially similar to those in the interference removing unit 1101. The process of the interference removing unit 1102 is realized by the CPU 122.

Referring to FIG. 10, the interference removing unit 1102 includes an interference detecting unit 11022 and an interference removal processing unit 11182. Further, the interference detecting unit 11022 includes a window multiplying unit 11042, a fast Fourier transforming unit 11062, a signal level calculating unit 11082, an averaging unit 11102, a threshold setting unit 11142, a peak detecting unit 11122 and a filter coefficient selecting unit 11162, which are structured as in FIG. 10.

The filter coefficient selecting unit 11162 is connected to the peak detecting unit 11122. The filter coefficient selecting unit 11162 selects the filter coefficient of a complex notch filter 11184 used in removing the interference signal by the interference removal processing unit 11182 based on the frequency number to be sent from the peak detecting unit 11122. Said differently, the filter coefficient selecting unit 11162 refers to a table associating the frequency of the interference signal detected from a signal received from the antenna #2 with the filter coefficient (hereinafter, referred to as an associated table between the filter coefficient and the interference signal detecting frequency for the antenna #2 or an associated table for the antenna #2) and selects the filter coefficient corresponding to the frequency number sent to the peak detecting unit 11122. The filter coefficient selecting unit 11162 sends the filter coefficient to the interference removal processing unit 11182.

Figures 11, 12:
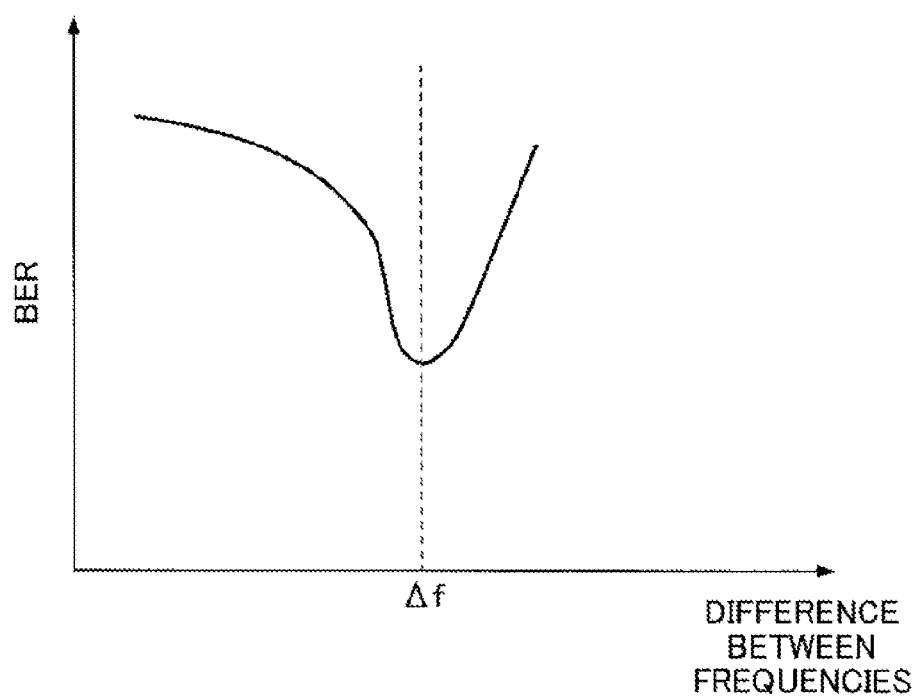
FIG. 11 illustrates an exemplary correspondence table between the interference signal detecting frequency and the filter coefficient.
FIG. 12 illustrates an exemplary relationship between a mistuned filter frequency and a bit error rate.

FIG. 11 is an exemplary associated table between the filter coefficient and the interference signal detecting frequency for the antenna #2. FIG. 11 illustrates the exemplary associated table between the frequency of the interference signal detected from the signal received by the antenna #2 and the filter coefficient. The frequency of the interference signal may be expressed by using the frequency at which the peak signal is detected. Said differently, referring to FIG. 11, if the frequency expressed by the frequency number sent from the peak detecting unit 11122 is "XX MHz", "XX MHz–Δf/2" is selected as a complex notch filter assigning frequency and "bbbb" is selected as the filter coefficient. Said differently, referring to FIG. 11, if the frequency expressed by the frequency number sent from the peak detecting unit 11122 is "oo MHz", "oo MHz–Δf/2" is selected as a complex notch filter assigning frequency and "yyyy" is selected as the filter coefficient. In the correspondence table for the antenna #2, the frequency obtained by shifting the frequency in a direction less than the frequency of the peak signal is referred to as the complex notch filter assigning frequency and the filter coefficient corresponding to the complex notch filter assigning frequency is determined.

The interference removal processing unit 11182 applies the complex notch filter 11184 having the filter coefficient received from the filter coefficient selecting unit 11162 to the digital signal received from the filter 1082 to thereby remove the interference signal. Then, the interference removal processing unit 11182 sends the signal from which the interference signal is removed to the DGC 1122. The output signal from the interference removal processing unit 11182 is as illustrated at (7) in FIG. 4, which is obtained by applying the complex notch filter 11184 having a central frequency obtained by subtracting Δf/2 from the frequency of the peak signal to be detected by the peak detecting unit 11122 to the output signal at (6) in FIG. 4. Therefore, the waveform of the output signal from the interference removal processing unit 11182 having the phase noise at the lower frequency side is removed relative to the frequency of the peak signal and therefore there are many remaining portions of the phase noise on the high frequency side.

Next, a difference Δf between the complex notch filter assigning frequency set by the associated table between the filter coefficient and the interference signal detecting frequency for the antenna #1 and the complex notch filter assigning frequency set by the associated table between the filter coefficient and the interference signal detecting frequency for the antenna #2 is described.

FIG. 12 illustrates a relationship between mistuned filter frequencies between the complex notch filter 11183 for the antenna #1 and the complex notch filter 11184 for the antenna #2 and a bit error rate BER).

When the central frequency of the complex notch filter 11183 used in the signal received from the antenna #1 and the central frequency of the complex notch filter 11184 used in the signal received from the antenna #2 are the same, adhering phase noises which are not respectively removed by the complex notch filters 11183 and 11184 have a correlation. Since the adhering phase noises have the correlation, noise components are stressed in a signal in which the output signals from the complex notch filters 11183 and 11184 are combined with the diversity combination.

The base station is set up when the central frequency of the complex notch filter 11183 used for the signal received by the antennas #1 differs from the central frequency of the complex notch filter 11184 used for the signal received by the antennas #2. Referring to FIG. 12, by increasing a difference between the central frequency of the complex notch filter 11183 used for the signal received by the antennas #1 and the central frequency of the complex notch filter 11184 used for the signal received by the antennas #2 (hereinafter, referred to as a frequency difference), the bit error rate (BER) decreases. However, after reaching the minimum BER, the BER increases as the frequency difference decreases. Therefore, with the embodiment, the frequency difference is set to be $\Delta f$ at which the BER takes the minimum value.

The base station 100 includes the BB processing unit 114. The BB processing unit 114 is connected to the DGC 1121 and the DGC 1122. The BB processing unit 114 combines the signal from the DGC 1121 and the signal from the DGC 1122 with the diversity combination. The BB processing unit 114 sends the signal having undergone the diversity combination to a radio network controller 120.

The signal from the DGC 1121 is processed so that the interference signal is removed by the interference removal processing unit 11181. The signal received from the DGC 1122 is processed so that the interference signal is removed by the interference removal processing unit 11182. Because the filter coefficient of the complex notch filter 11183 used in removing the interference signal by the interference removal processing unit 11181 and the filter coefficient of the complex notch filter 11184 used in removing the interference signal by the interference removal processing unit 11182 are different, the frequency of the adhering phase noise contained in the signal from the DGC 1121 greatly differs from the frequency of the adhering phase noise contained in the signal from the DGC 1122. Said differently, the adhering phase noise contained in the signal from the DGC 1121 slightly overlaps the adhering phase noise contained in the signal from the DGC 1122 on the axis of the frequencies. Therefore, the signal obtained with the diversity combination by combining the signal from the DGC 1121 and the signal from the DGC 1122 has a sufficient maximum ratio combined gain thereby improving a diversity effect. The output signal from the BB processing unit 114 is obtained by combining the output signal at (4) in FIG. 4 and the output signal at (7) in FIG. 4. The output signal at (4) in FIG. 4 has a waveform in which the remaining portion of the phase noise on the lower frequency side relative to the peak signal is much. The output signal at (7) in FIG. 4 has a waveform in which the remaining portion of the phase noise on the higher frequency side relative to the peak signal is much. Therefore, the remaining portions of the phase noises do not overlap to thereby reduce phase noise components in the signal obtained by combining with the diversity combination.

The base station 100 includes the radio network controller 120. The radio network controller 120 is connected to the BB processing unit 114. The radio network controller 120 performs a predetermined process based on the signal obtained from the BB processing unit 114. For example, it is possible to transfer to a destination of the signal from the BB processing unit 114.

<Operation of Base Station 100>

FIG. 13 illustrates an exemplary operation of the base station 100 of the embodiment.

The base station 100 receives the wireless signal by the antenna #1 in step S1302. Said differently, the wireless signal sent from the antenna #1 is received by the RF unit 1021.

In step S1304, the base station 100 down-converts the signal received in step S1302. The mixer 1041 converts the received signal to a signal having an intermediate frequency by mixing the local signal from the divider 118 and the signal received from the RF unit 1021.

In step S1306, the base station 100 converts the signal down-converted in step S1304. The ADC 1061 converts the signal having the intermediate frequency from the mixer 1041 to a digital signal.

In step S1308, the base station 100 detects the interference signal from the converted digital signal obtained in step S1306. Said differently, the peak detecting unit 1112 of the interference detecting unit 11021 detects the interference signal from the converted digital signal obtained in step S1306.

If the interference signal is detected in YES of step S1308, the base station 100 selects a filter coefficient corresponding to the frequency number of the interference signal out of the associated table between the filter coefficient and the interference signal detecting frequency for the antenna #1 in step S1310. Said differently, the filter coefficient selecting unit 11161 selects the filter coefficient corresponding to the frequency number obtained from the peak detecting unit 11121.

In step S1312, the base station 100 assigns the filter coefficient selected in step S1310. Said differently, the interference removal processing unit 11181 assigns the complex notch filter 11183 corresponding to the filter coefficient selected by the filter coefficient selecting unit 11161.

In step S1314, the base station 100 removes the interference signal by the complex notch filter 11183 assigned in step S1312. Said differently, the interference removal processing unit 11181 removes the interference signal from the signal sent from the filter 1081 by the complex notch filter 11183 assigned in step S1312.

The base station 100 receives the wireless signal by the antenna #2 in step S1316. Said differently, the wireless signal sent from the antenna #2 is received by the RF unit 1022.

In step S1318, the base station 100 down-converts the signal received in step S1316. The mixer 1042 converts the received signal to a signal having an intermediate frequency by mixing the local signal from the divider 118 and the signal received from the RF unit 1022.

In step S1320, the base station 100 converts the signal down-converted in step S1318. Said differently, the ADC 1062 converts the signal having the intermediate frequency from the mixer 1042 to a digital signal.

In step S1322, the base station 100 detects the interference signal from the converted digital signal obtained in step S1320. Said differently, the peak detecting unit 11122 of the interference detecting unit 11022 detects the interference signal from the converted digital signal obtained in step S1320.

If the interference signal is detected in YES of step S1322, the base station 100 selects a filter coefficient corresponding to the frequency number of the interference signal out of the associated table between the filter coefficient and the interference signal detecting frequency for the antenna #2 in step S1324. Said differently, the filter coefficient selecting unit 11162 selects the filter coefficient corresponding to the frequency number obtained from the peak detecting unit 11122.

In step S1326, the base station 100 assigns the filter coefficient selected in step S1324. Said differently, the interference removal processing unit 11182 assigns the complex notch filter 11184 corresponding to the filter coefficient selected by the filter coefficient selecting unit 11162.

In step S1328, the base station 100 removes the interference signal by the complex notch filter 11184 assigned in step S1326. Said differently, the interference removal processing unit 11182 removes the interference signal from the signal sent from the filter 1082 by the complex notch filter 11184 assigned in step S1326.

Then, in step S1330, the signal from which the interference signal is removed in step S1314 and the signal from which the interference signal is removed in step S1328 are combined with the diversity combination. Said differently, the BB processing unit 114 combines the signal sent from the interference removal processing unit 11181 (provided with the digital gain control by the DGC 1121) and the signal sent from the interference removal processing unit 11182 (provided with the digital gain control by the DGC 1122) with a diversity combination.

The signal undergoing the diversity combination in step S1330 is further provided with a predetermined process by the radio network controller 120.

With the embodiment, even if the circuit for generating the local signal which is to be combined with the signals received by the plural antennas is used in common for the circuits for processing the signals received by the antennas, quality in receiving the signals can be improved to thereby improve the diversity effect. Specifically, when an interference signal or a disturbing signal is received in addition to a desired signal, an adhering phase noise can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
a local signal generator configured to generate a local signal;
a first mixer configured to generate a first mixed signal obtained by mixing a first signal from a first antenna and the local signal from the local signal generator;
a first analog digital converter configured to convert the first mixed signal to a first digital signal;
a first interference detecting unit configured to detect a first interference signal based on the first digital signal;
a first interference removing unit configured to generate a first processed signal by removing the first interference signal by a first filter having a first filter central frequency which is shifted in a first direction from a first interference central frequency of the first interference signal;
a second mixer configured to generate a second mixed signal obtained by mixing a second signal from a second antenna and the local signal from the local signal generator;
a second analog digital converter configured to convert the second mixed signal to a second digital signal;
a second interference detecting unit configured to detect a second interference signal based on the second digital signal;
a second interference removing unit configured to generate a second processed signal by removing the second interference signal by a second filter having a second filter central frequency which is shifted in a second direction from a second interference central frequency of the second interference signal; and
a combining unit configured to combine the first processed signal and the second processed signal,
wherein the first direction of the first filter central frequency of the first filter shifted from the first interference central frequency of the first interference signal and the second direction of the second filter central frequency of the second filter shifted from the second interference central frequency of the second interference signal are different.

2. The base station according to claim 1,
wherein the first interference detecting unit includes:
a first fast Fourier transforming unit configured to apply a fast Fourier transformation to the first digital signal;
a first signal level calculating unit configured to calculate a first signal level of the first digital signal applied with the fast Fourier transformation;
a first averaging unit configured to output a first averaged signal level by averaging the first signal level;
a first threshold setting unit configured to set a first threshold used to detect the first interference signal based on the first averaged signal level;
a first peak detecting unit configured to detect out of the first averaged signal level a first peak signal which has a value greater than the first threshold and whose signal level is maximum,
wherein the first interference removing unit removes the first interference signal from the first digital signal using the first filter selected by the first peak signal,
wherein the second interference detecting unit includes:
a second fast Fourier transforming unit configured to apply a fast Fourier transformation to the second digital signal;
a second signal level calculating unit configured to calculate a second signal level of the second digital signal applied with the fast Fourier transformation;
a second averaging unit configured to output a second averaged signal level by averaging the second signal level;
a second threshold setting unit configured to set a second threshold used to detect the second interference signal based on the second averaged signal level;
a second peak detecting unit configured to detect out of the second averaged signal level a second peak signal which has a value greater than the second threshold and whose signal level is maximum, and
wherein the second interference removing unit removes the second interference signal from the second digital signal using the second filter selected by the second peak signal.

3. The base station according to claim 2, further comprising:
a first table associating the first interference central frequency and the first filter having the first filter central frequency which is shifted in the first direction from the first interference central frequency of the first interference signal; and
a second table associating the second interference central frequency and the second filter having the second filter central frequency which is shifted in the second direction from the second interference central frequency of the second interference signal, wherein the first interference removing unit refers to the first table and selects the first filter based on the first peak signal, and wherein the second interference removing unit refers to the second table and selects the second filter based on the second peak signal.

4. The base station according to claim 1, wherein a first amount of the frequency shifted in the first direction and a second amount of the frequency shifted in the second direction are determined based on a bit error rate.

5. The base station according to claim 3, wherein the first table associates the first interference central frequency and a first filter coefficient of the first filter, wherein the second table associates the second interference central frequency and a second filter coefficient of the second filter, wherein the first interference removing unit refers to the first table and selects the first filter coefficient of the first filter based on the first peak signal, and wherein the second interference removing unit refers to the second table and selects the second filter coefficient of the second filter based on the second peak signal.

6. A receiving method performed by a receiving device capable of using a plurality of antennas, the receiving method comprising:

generating a local signal;

generating a first mixed signal obtained by mixing a first signal from a first antenna among the antennas and the local signal;

converting the first mixed signal to a first digital signal;

detecting a first interference signal based on the first digital signal;

generating a first processed signal by removing the first interference signal by a first filter having a first filter central frequency which is shifted in a first direction from a first interference central frequency of the first interference signal;

generating a second mixed signal obtained by mixing a second signal from a second antenna among the antennas and the local signal from the local signal generator;

converting the second mixed signal to a second digital signal;

detecting a second interference signal based on the second digital signal;

generating a second processed signal by removing the second interference signal by a second filter having a second filter central frequency which is shifted in a second direction from a second interference central frequency of the second interference signal; and combining the first processed signal and the second processed signal, wherein the first direction of the first filter central frequency of the first filter shifted from the first interference central frequency of the first interference signal and the second direction of the second filter central frequency of the second filter shifted from the second interference central frequency of the second interference signal are different.

7. The receiving method according to claim 6, wherein the detecting a first interference signal includes:

applying a fast Fourier transformation to the first digital signal;

calculating a first signal level of the first digital signal applied with the fast Fourier transformation;

outputting a first averaged signal level by averaging the first signal level;

setting a first threshold used to detect the first interference signal based on the first averaged signal level;

detecting out of the first averaged signal level a first peak signal which has a value greater than the first threshold and whose signal level is maximum, wherein the generating the first processed signal removes the first interference signal from the first digital signal using the first filter selected by the first peak signal, wherein the detecting a second interference signal includes:

applying a fast Fourier transformation to the second digital signal;

calculating a second signal level of the second digital signal applied with the fast Fourier transformation;

outputting a second averaged signal level by averaging the second signal level;

setting a second threshold used to detect the second interference signal based on the second averaged signal level;

detecting out of the second averaged signal level a second peak signal which has a value greater than the second threshold and whose signal level is maximum, and wherein the generating the second processed signal removes the second interference signal from the second digital signal using the second filter selected by the second peak signal.

* * * * *